United States Patent [19]

Sweatman et al.

[11] Patent Number: 4,512,405
[45] Date of Patent: Apr. 23, 1985

[54] PNEUMATIC TRANSFER OF SOLIDS INTO WELLS

[75] Inventors: Ronald E. Sweatman, Cypress, Tex.; Earl R. Freeman, Oklahoma City, Okla.; John Gottschling, Williamstown; John Simon, Ripley, both of W. Va.

[73] Assignee: Hughes Tool Company, Houston, Tex.

[21] Appl. No.: 584,581

[22] Filed: Feb. 29, 1984

[51] Int. Cl.³ .................. E21B 33/138; E21B 43/08; E21B 43/267
[52] U.S. Cl. ................................. 166/278; 166/280; 166/292; 166/308; 175/72
[58] Field of Search ............... 166/259, 271, 276, 278, 166/280, 281, 285, 292, 308, 311; 175/71, 72

[56] References Cited

U.S. PATENT DOCUMENTS

| | | | |
|---|---|---|---|
| 2,054,748 | 9/1936 | Griffin | 166/278 |
| 2,738,163 | 3/1956 | Shields | 175/68 |
| 3,196,946 | 7/1965 | Lauffer | 166/285 |
| 3,277,971 | 10/1966 | Dawson | 175/71 |
| 3,288,230 | 11/1966 | Braunlich, Jr. et al. | 175/72 X |
| 3,468,376 | 9/1969 | Slusser et al. | 166/259 X |
| 3,603,398 | 9/1971 | Hutchison et al. | 166/305 R |
| 3,981,362 | 9/1976 | Allen et al. | 166/259 X |
| 4,003,432 | 1/1977 | Paull et al. | 166/271 |
| 4,126,181 | 11/1978 | Black | 166/280 |

OTHER PUBLICATIONS

Randall et al., "Stearates, Foaming Agents Combat Water in Air or Gas Drilling", *The Oil and Gas Journal*, Nov. 3, 1958, pp. 78–83.

Smith, *The Oil and Gas Journal*, vol. 57, No. 44, Oct. 26, 1959, pp. 83–86.

Abel, "Application of Nitrogen Fracturing in the Oil Shale", AIME Paper No. SPE 10378, 1981.

Freeman et al., "A Stimulation Technique Using Only Nitrogen", AIME Paper No. SPE 10129, 1981.

*Primary Examiner*—George A. Suchfield
*Attorney, Agent, or Firm*—Robert A. Felsman; Charles D. Gunter, Jr.

[57] ABSTRACT

A method for pneumatically transferring particluate solid materials into an earth formation penetrated by a well bore is shown. A gas is flowed into the well bore to establish the desired injection rate and pressure. A particulate solid material is then added to the established gas flow passing into the well bore by flowing a gas containing an entrained particulate solid material into the established gas flow to thereby transfer the solid particulate material pneumatically into the well bore.

17 Claims, 7 Drawing Figures

PNEUMATIC TRANSFER OF SOLIDS INTO WELLS

CROSS-REFERENCE TO RELATED APPLICATIONS

The present invention is related to the field of the invention disclosed and claimed in copending U.S. patent application Ser. No. 584,584 entitled METHOD AND APPARATUS FOR INCREASING THE CONCENTRATION OF PROPPANT IN WELL STIMULATION TECHNIQUES, filed concurrently herewith.

BACKGROUND OF THE INVENTION

This invention relates to a method of placing material in an earth formation penetrated by a well bore and, more particularly, to the pneumatic transfer of particulate solid materials into an earth formation penetrated by a well bore.

There are many techniques known in the art for placing material in an earth formation penetrated by a well bore.

Certain of the prior techniques involve the placement of lost circulation materials in a highly porous zone when drilling a well. The porous zone may be taking drilling fluid in such amounts that none remains for circulation of the hole, for instance. Similarly, in water injection wells one highly porous interval of a formation may be taking all or substantially all of the injected water, thereby preventing good water flood results over the entire producing formation. The same problem develops in producing wells where an unconsolidated formation causes sand to be deposited in a producing well. In such cases, it is often desirable to place sand, gravel or a similar solid particulate material in a formation adjacent a well liner to overcome such problems.

Other prior techniques for placing particulate material in well bores involve well stimulation. In stimulating production of crude oil and natural gas from wells drilled in reservoirs of low permeability, the earthern formation is typically fractured with various liquids, such as crude oil, with or without propping agents, such as sand suspended therein. The hydraulic pressure applied to such formations creates stresses in the rock of the formation surrounding the well bore and causes splitting or fracturing of the rock. The initially formed fractures or channels are then extended by the injection of fluids containing propping agents to be deposited in the fractures. When the pressure is released, the propping agent deposited in the fractures holds the fractures open, leaving channels for reservoir fluid flow. The concentration of propping agent in the fracture is significant since it determines the final thickness of the fracture.

A more recent development in fracturing techniques involves the use of a fracturing foam which is formed by blending sand into gelled water and treating the slurry with a surfactant. The fluid pressure is increased with a pump after which a gas, such as nitrogen or carbon dioxide, is injected into the fluid to create a high pressure foam. Foam has several advantages over traditional fluids, such as low fluid loss and decreased formation damage for water sensitive formations. Sand does not settle out of the foam quickly during unplanned shutdowns during the treatment and foam has a high effective viscosity.

An even more recent development in well fracturing is the use of gaseous nitrogen alone as a fracturing fluid. There are several advantages of using nitrogen as the fracturing fluid, including its non-damaging characteristics, minimum shut-in time and nominal treatment costs. The liquid content of fracturing fluids is extremely crucial when treating liquid sensitive formations since liquids can cause clay migration and swelling in the formation, thereby reducing permeability to the produced fluids. Nitrogen, on the other hand, is inert, relatively insoluble and compressible. These properties minimize damage to shale formations, in particular. Nitrogen fracturing also virtually eliminates the cleanup problems associated with liquid systems. Once the treatment is completed, the well is opened up and the gas is flowed back. Production is not lost and costly swabbing units to recover fluids are not needed.

Even though nitrogen fracturing has many advantages over traditional liquid and foam fracturing techniques, the need exists for a nitrogen fracturing technique which allows the simultaneous placement of propping agents within the fractured earthern formation. The propping agent is then effective to prop open the crevices created and withstand the tremendous pressures from the overburden when the fracturing pressure is relieved.

SUMMARY OF THE INVENTION

In this invention, particulate solid materials are pneumatically transferred into an earth formation penetrated by a well bore by first flowing a gas into the well bore to establish the desired injection rate and pressure. A particulate solid material is then added to the established gas flow passing into the well bore by flowing a gas containing an entrained particulate solid material into the established gas flow to thereby transfer the solid particulate material pneumatically into the well bore.

Preferably, nitrogen gas is flowed down the pipe string passing into the well bore to the zone proximate the earth formation to be treated until a desired gas injection rate and pressure are attained. Nitrogen gas is then flowed through a suitable conduit into a solids dispensing manifold whereby solid particulate materials become entrained within the gas flow passing through the conduit. The particulate laden gas flow is then communicated to the pipe string passing to the well zone to be treated to thereby transfer the solid particulate material pneumatically into the well bore. The solid material can be any particulate solid such as sand, cement, solid diverting agents and chemical plugging agents.

Additional objects, features and advantages will be apparent in the written description which follows.

DETAILED DESCRIPTION OF THE INVENTION

Figure 1:
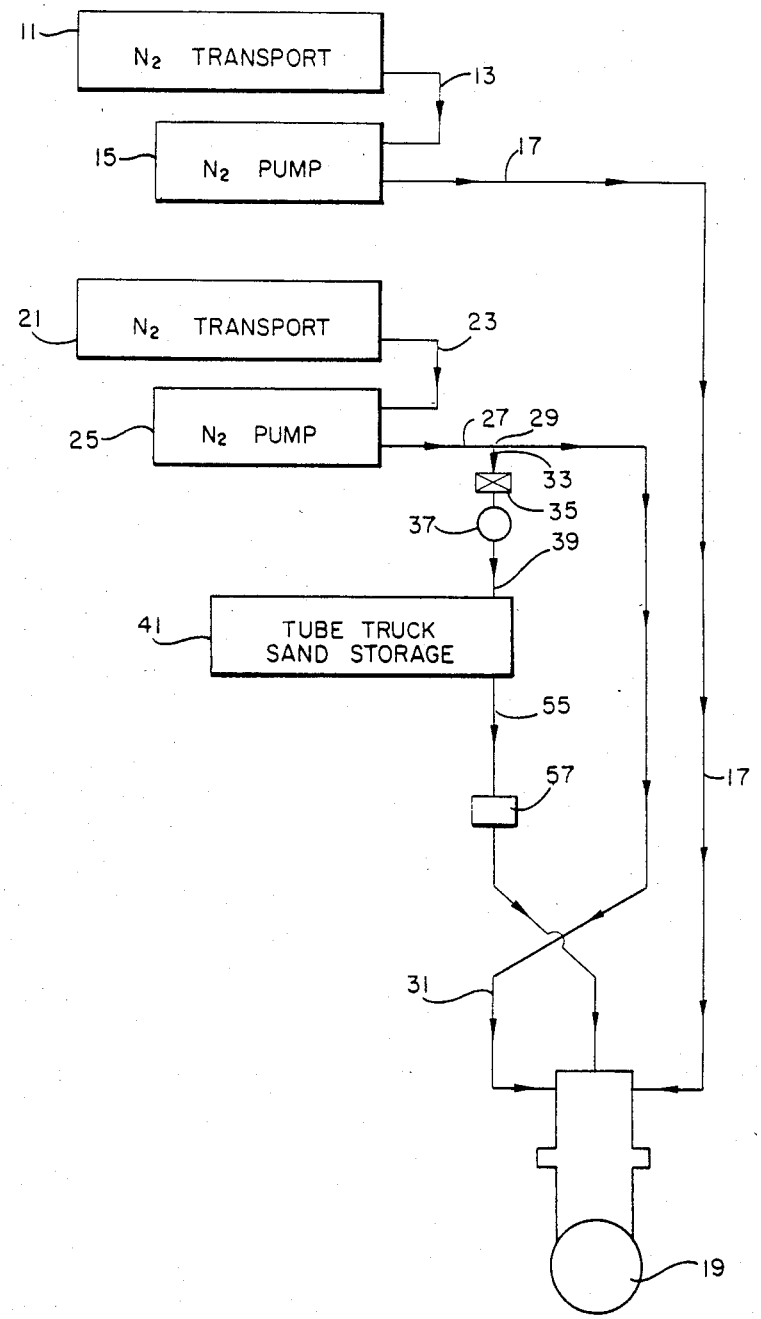
FIG. 1 is a schematic diagram of the method of the invention for transferring proppant pneumatically into an earth formation.

FIG. 1 is a schematic diagram of a well treatment operation which illustrates the principles of the invention. In the method illustrated in FIG. 1, a particulate solid material, such as sand, is pneumatically transferred into an earth formation penetrated by a well bore. A nitrogen transport truck 11 of the type known in the well fracturing art provides a supply of gas at the well site. The nitrogen transport truck 11 communicates by means of a conduit 13 with a standard nitrogen pump 15 which is capable of passing nitrogen at a high rate of flow and low pressure out a conduit 17 passing to the wellhead 19. The nitrogen transport 11 includes a heat exchanger which converts the liquid nitrogen transported in the tank on the nitrogen transport 11 to a gas which is then pumped by the nitrogen pump 15 at a rate in the range of about 10,000 to 50,000 scf/min. and at less than about 5,000 psig pressure.

A second nitrogen transport truck 21 supplies nitrogen gas through a conduit 23 to a nitrogen pump 25, identical to pump 15, and out a conduit 27. The flow of pressurized nitrogen gas out conduit 27 is split at a T-connection 29 between a conduit 31 passing to the opposite side of the wellhead 19 from conduit 17 and a conduit 33. A valve 35 controls the flow of nitrogen gas through the conduit 33. By opening valve 35, the gaseous flow passing through conduit 33 passes through a differential orifice meter 37 which reduces the flow rate of the nitrogen to the range from about 400 to 2500 scf/min. The gaseous nitrogen then passes through an inlet flow line 39 to a tube truck sand storage manifold 41.

The tube truck sand storage manifold 41 is illustrated in greater detail in FIG's. 4 and 5. The manifold 41 is connected by suitable T-connections 43 to a series of particulate containers 45. The particulate containers 45 are preferably generally cylindrical tubes having closed ends. Each tube has a loading end or cap 47 for receiving a quantity of solid particulate from a holding tank or bin (not shown) and a discharge cap or end 49 for dispensing solid particulates to the common manifold 41.

In the method illustrated in FIG. 1, the containers 45 are filled with a propping agent such as 40 to 60 screen sand. However, other types and screen sizes of proppants can be used including glass, plastics or metal particles. The tube design of the containers 45 allows for low cost construction as opposed to heavy wall relatively short height or length pressure vessel designs with inside length to inside diameter ratios of less than about 5 to 1. Preferably, the tubes used for the proppant containers 45 have such ratios in the range from about 5 to 1 to upwards of 500 to 1. The tubes 45 are mounted by any convenient means on the pivoting bed 51 of a transport truck 53 whereby the longitudinal axis of the proppant carrier tubes 45 can be pivoted with respect to the bed 51 of the truck 53 to allow the proppant in the containers 45 to flow by gravity feed to the manifold 41. Valves 46 (FIG. 5) can be provided for controlling the flow of proppant from the containers 45 to the manifold 41. The degree of pivoting and various orifice sizes can be used to add more control of the flow of proppant.

An alternative or enhancement to gravity feed is to force proppant out of the tubes by gas flow into one end of the tubes thru a common inlet manifold and the proppant and gas mixture out the opposite end of the tubes into a common discharge manifold. The common inlet manifold may be mounted on the opposite end of the tubes from the discharge manifold and may be used for loading proppant into the tubes. The inlet manifold may also be placed at any point between the ends of the tubes when enhancing gravity feed. Each tube may also have a valve to control the discharge rate.

An alternative pneumatic force feed thru the tubes can enhance the gravity feed method when well conditions require very high proppant discharge rates or where conditions require the tubes to discharge proppant with the tubes in the horizontal position.

The nitrogen inlet line 39 is connected to one end of the manifold 41 for supplying gaseous nitrogen to the manifold and the manifold 41 has an outlet line 55 (FIG. 1) for flowing nitrogen gas containing entrained particulate solid material to the wellhead 19. A nuclear densimeter 57 can be provided in the line 55 to monitor the concentration of sand which is entrained in the gas flow passing to the wellhead 19. Preferably, the gaseous flow passing through line 55 passes to the center portion 20 of the wellhead 19 (FIG. 5) whereby the relatively high rate nitrogen flow in conduits 17, 31 pass on either side and act as a cushion for the sand entrained in the gas flow in line 55 entering the wellhead 19.

In practicing the method of the invention as illustrated in FIG. 1, nitrogen gas is flowed into the well bore through conduits 17, 31 to establish the desired injection rate and pressure. The valve 35 in conduit 33 is then opened and nitrogen gas is flowed through the inlet flow line 39 into the solids dispensing manifold 41 of the tube truck whereby solid particulate material becomes entrained within the gas flow passing through the outlet line 55. The gaseous flow containing entrained solid particulate material flows through the outlet line 55 to the wellhead 19 and merges with the established gas flow to thereby transfer the solid particulate material pneumatically into the well bore. Pumping times typically range from about 20 minutes to 1 hour with the average pumping time being about 45 minutes.

Figure 5:
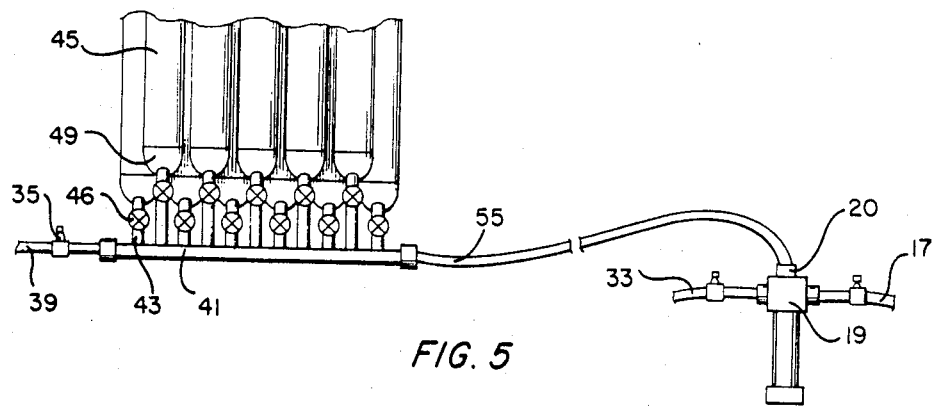
FIG. 5 is a partial close-up view of the solids dispensing manifold used in practicing the method of the invention.

While the method illustrated in FIG. 1 discussed particulate containers 45, all of which contained proppant, one or more of the containers 45 can contain a solid particulate diverting agent such as rock salt, benzoic acid flakes, etc., to be opened between sand stages when fracturing different formations on one fracturing job. Such staggered operation can be effected by opening and closing valves 46 (FIG. 5).

Figure 2A:
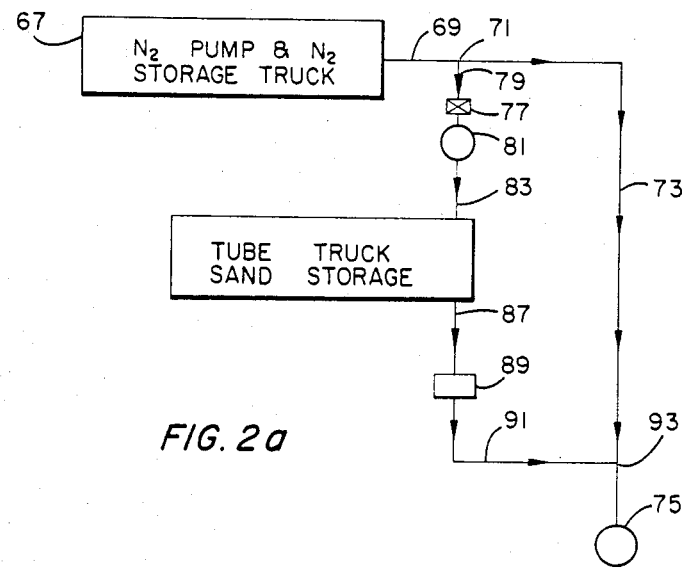
FIG. 2 is a another embodiment of the method of the invention for depositing sand adjacent a well liner.
Figure 2B:
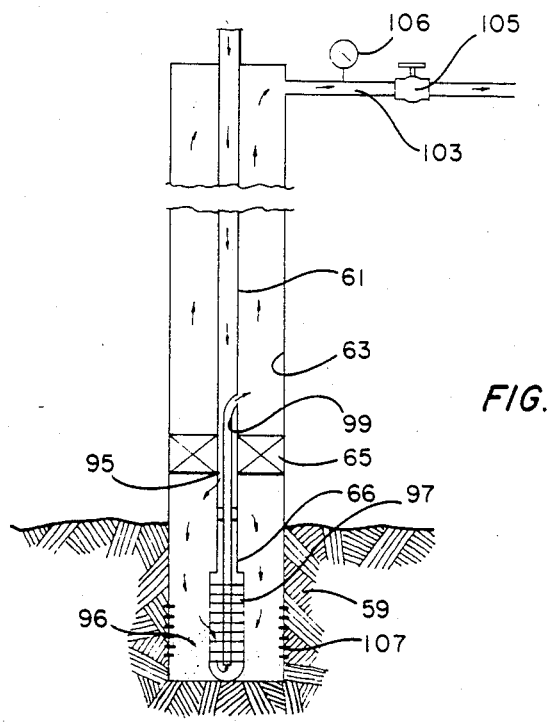

FIG's. 2a and 2b schematically illustrate another embodiment of the method of the invention used for pneumatically transferring particulate solid materials into an earth formation 59 penetrated by a pipe string 61 within a well bore lined by a casing 63. As illustrated in FIG. 2b, the well bore is first packed off by a conventional packer 65 to define a zone to be treated between the pipe string 61 and the well bore. Nitrogen from a storage truck and pump 67 (FIG. 2a) passes out a conduit 69 to a T-connection 71. Nitrogen passes through conduit 73 at a low to high rate to the wellhead 75. By a "low relative gas flow rate" is meant any rate sufficient to pneumatically transfer solids to the wellhead. By a "high relative gas flow rate" is meant any rate sufficient to transfer solids into the wellbore and/or into the formation. The remaining nitrogen flow passes through a valve 77 and a conduit 79 to a low rate meter 81 to provide a gaseous nitrogen flow rate through the manifold inlet flow line 83 in the range from about 400 to 2500 scf/min. The gas flow in inlet flow line 83 passes through the solid dispensing manifold 85, as before, and out an outlet line 87 to a nuclear densimeter 89 and through a conduit 91 to a T-connection 93 which communicates with conduit 73. T-connection 93 can be mounted directly on top of the wellhead 75 or pipe string 61.

The particulate solid material, in this case sand, is added to the established gas flow passing into the pipe string 61 (FIG. 2b) at the wellhead 75 by communicating the gas in conduit 91 containing entrained sand to the conduit 73. The combined gas and entrained sand pass down the pipe string 61 and out an opening 95 provided adjacent the formation 59 being treated, whereby the sand is pneumatically deposited in the well annulus 96 located between the pipe string 61 and the casing 63.

As shown in FIG. 2b, the lower end of the pipe string 66 is provided with a screen or slotted liner 97 which screens out the solid particulate material while allowing the gaseous nitrogen to pass up an interior passageway 99 provided within the pipe string 61 and out a return opening provided in the pipe string located above the packed off zone. The returning nitrogen then passes up the well annulus to an exhaust conduit 103 located at the well surface. If desired, a selected back pressure can be maintained on the well zone being treated by providing an adjustable choke 105 and pressure gauge 106 in the exhaust conduit 103 located at the well surface. If the choke 105 is completely closed, some sand is forced out perforations 107 in the casing and a non-circulating pack is provided. This technique can be useful in high pressure reservoirs, for instance. The choke 105 can be opened a selected amount to provide a partial return of gas to the well surface to deposit sand in the well annulus between the screen 97 and casing 63.

FIG.'s. 3a and 3b schematically illustrate another embodiment of the method of the invention in which the solid particulate material is cement or some other known solid plugging material. Nitrogen is provided from a pump and storage truck 109 as before through a conduit 111 which is split at a T-connection 113 between a conduit 115 passing to the wellhead 117 and a conduit 119. A valve 121 controls the flow of gas through conduit 119 to a low rate meter 123 and a sand dispensing manifold 125 as before. The particulate containers on the tube truck would in this case contain dry cement or dry plugging chemicals for sealing off lost circulation formations, for example. The gas flow passing down the outlet line 127 and containing the entrained solid particulate material communicates by means of a T-connection 129 with the gas flow passing through conduit 115 to the wellhead 117.

Figure 3A:
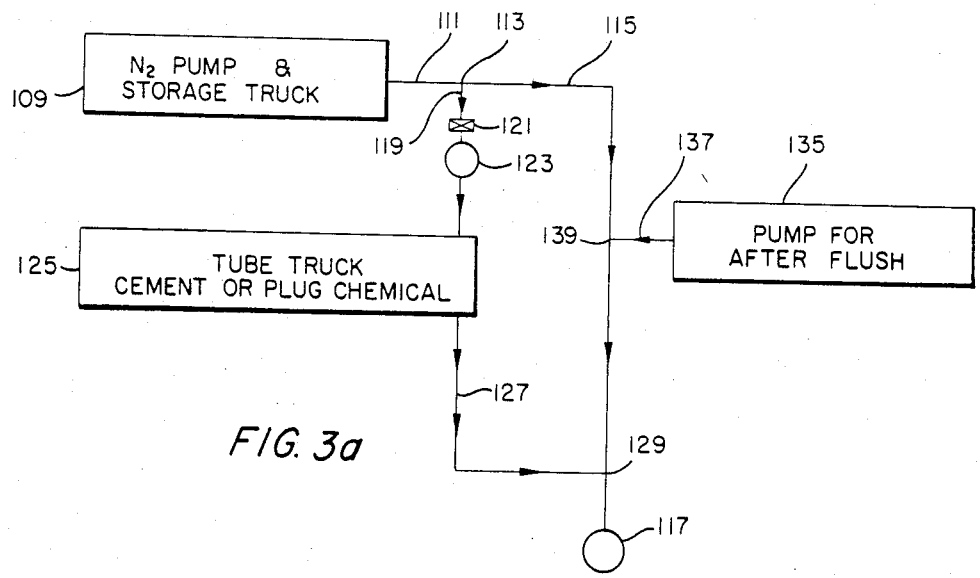
FIG. 3 is another embodiment of the method of the invention for transferring solid plugging materials pneumatically into the well bore.
Figure 3B:
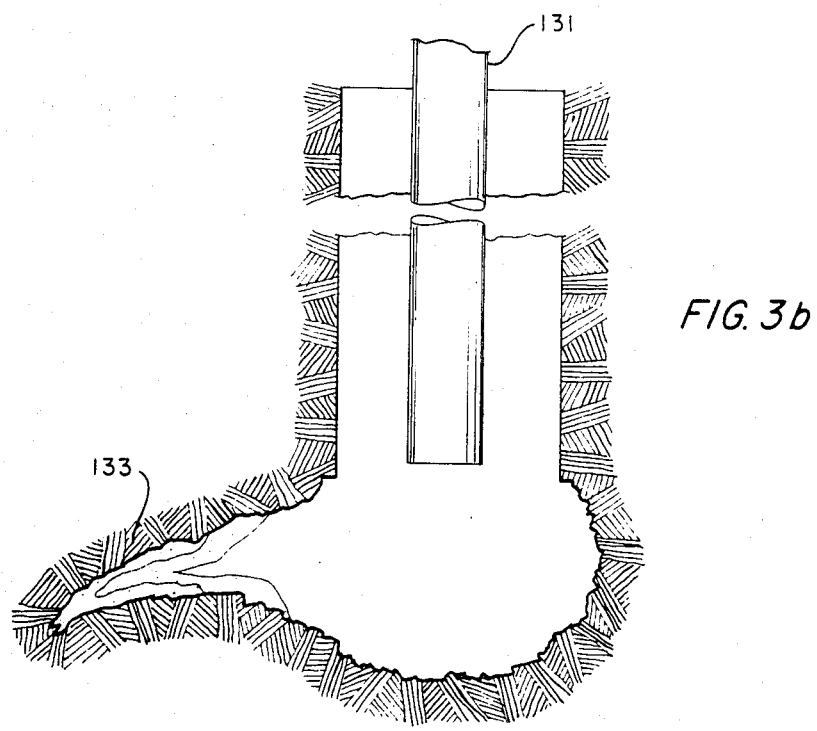
Figure 4:
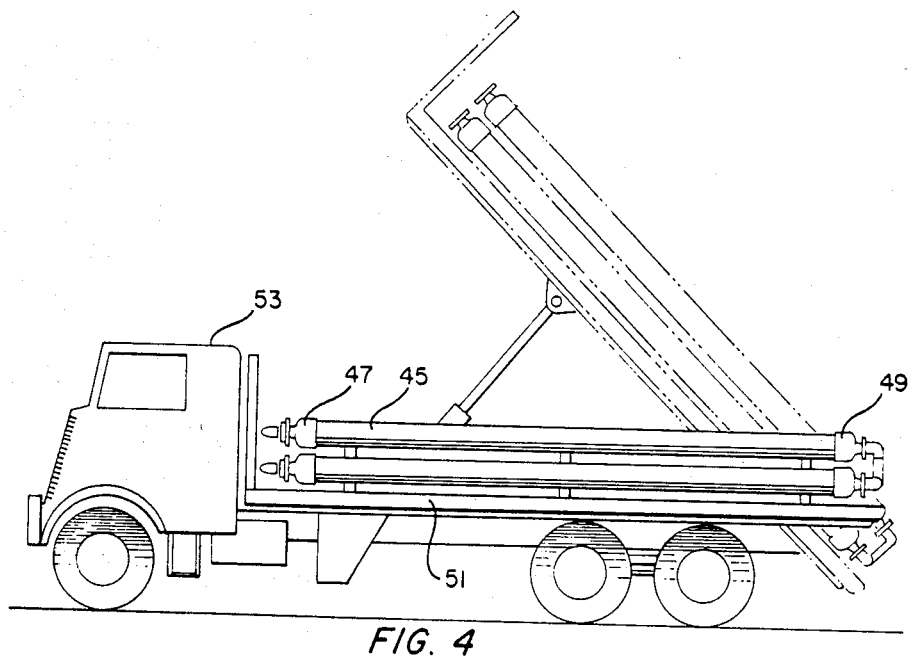
FIG. 4 is a side perspective view of a tube truck used in practicing the method of the invention.

As shown in FIG. 3b, the combined gas and entrained cement or plugging material passes down the pipe string 131 extending from the well head 117 to a lost circulation formation 133 to pack the fractures therein. Native formation fluids in the formation 133 can effect setting of the plugging material or, if desired, a liquid after flush can be pumped from a pump truck 135 (FIG. 3a) through a conduit 137 which communicates by means of a T-connection 139 with the conduit 115 passing to the well bore. The liquid after flush passes down the pipe string 131 to the lost circulation zone 133 where the particulate plugging materials were previously deposited to effect setting of the particulate sealing materials.

While the method illustrated uses cement, a chemical plugging material capable of being activated to seal off the formation can be used as well. Barite, hematite, or lead can be used to densify the plug to over balance a zone containing high pressure.

An invention has been provided with significant advantages. By pneumatically transferring particulate solid materials to the earth formation being treated, all water and other fluids can be eliminated on fracturing and sand control jobs. By using a gas to carry proppants, diverting agents, and other solid materials, fluid sensitive producing formations in the well bore are not damaged. The present method eliminates the need for proppant-fluid blender equipment on the job site and lowers job costs since less equipment and personnel are required. Chemicals such as surfactants are eliminated as well. The present techniques are more efficient than prior methods, especially in air or foam drilled wells, since plugging of lost circulation zones can be obtained by pneumatic placement of cement or dry plugging chemicals in the formation without the use of diesel oil cement squeezes or other techniques.

The present method allows diverting agents such as benzoic acid, rock salt, and the like to be placed without the partial dissolving which would occur in a fluid carrier. By using a gas to transport a propping agent into the fractured formation, more of the reservoir fluid can be produced without the decline in production associated with damaged permeability or unpropped fractures.

While the invention has been shown in only three of its forms, it is not thus limited but is susceptible to various changes and modifications without departing from the spirit thereof.

I claim:

1. A method of pneumatically transferring particulate solid materials into an earth formation penetrated by a well bore, comprising the steps of:
    flowing a gas into the well bore to establish the desired injection rate and pressure; and
    adding a particulate solid material to the established gas flow passing into the well bore by flowing a gas containing an entrained particulate solid material into the established gas flow to thereby transfer the solid particulate material pneumatically into the well bore.

2. A method of pneumatically transferring particulate solid materials into an earth formation penetrated by a well bore, comprising the steps of:
    flowing a gas at a high relative rate into the well bore to establish an injection rate and pressure sufficient to fracture the earth formation;
    adding a particulate solid material to the established gas flow passing into the well bore by flowing a gas at a low relative rate containing an entrained particulate solid material into the established gas flow until a desired quantity of proppant is transferred to the earth formation and the fracturing operation is complete; and
    shutting off the flow of gas and resuming production from the well.

3. The method of claim 2, wherein the high relative gas flow rate is in the range from about 10,000 to 50,000 scf/min. and the low relative gas flow rate is in the range from about 400 to 2500 scf/min.

4. The method of claim 2, wherein the solid particulate material is a propping agent.

5. The method of claim 2, wherein the solid particulate material is a solid diverting agent.

6. A method of pneumatically transferring particulate solid materials in an earth formation penetrated by a pipe string within a well bore, comprising the steps of:
- packing off the area between the pipe string and the well bore to define a well zone to be treated;
- flowing a gas down the pipe string and out an opening in the pipe string provided adjacent the well zone to be treated;
- adding a particulate solid material to the established gas flow passing into the pipe string by communicating a gas containing an entrained particulate solid material through a suitable conduit into the established gas flow; and
- flowing the combined gas and entrained particulate solid materials down the pipe string and out the opening in the pipe string provided adjacent the formation zone being treated, whereby the solid particulate materials are pneumatically deposited in the well annulus located between the pipe string and the well bore.

7. The method of claim 6, wherein the area between the pipe string and the well bore is packed off at the surface of the well.

8. The method of claim 6, wherein the combined gas and entrained particulate solid materials are flowed down the annulus between the pipe string and the well bore.

9. The method of claim 6, wherein:
- the pipe string passing adjacent the well zone being treated is provided with a screen section whereby gas passing out the opening in the pipe and depositing particulate solid material in the well annulus passes through the pipe screen, up an interior passageway provided within the pipe string, out a return opening provided in the pipe string located above the packed off zone, and up the well annulus to an exhaust conduit located at the well surface.

10. The method of claim 9, further comprising the steps of:
- maintaining a selected backpressure on the well zone being treated by providing an adjustable choke in the exhaust conduit located at the well surface to provide a partial return of gas flow to the surface.

11. The method of claim 10, wherein the adjustable choke provided in the exhaust conduit is closed to force all of the gas flow into the earth formation being treated.

12. The method of claim 6, wherein the flow of combined gas and solids is down the annulus between the pipe string and the well bore to deposit solids in the well annulus and the exhaust gas is returned to the surface through the pipe screen and pipe string to an exhaust conduit.

13. The method of claim 6, wherein the particulate solid material is sand, or propping agent.

14. A method of pneumatically transferring particulate solid materials into a lost circulation zone of an earth formation penetrated by a pipe string within a well bore, comprising the steps of:
- flowing a gas down the pipe string into the zone proximate the earth formation to be treated;
- adding a particulate sealing material selected from the group consisting of cement and chemical plugging materials to the established gas flow passing into the pipe string by communicating a gas containing the selected particulate material entrained therein through a suitable conduit into the established gas flow; and
- flowing the combined gas and entrained particulate materials down the pipe string and out into the lost circulation zone to be sealed.

15. The method of claim 14, wherein native formation fluids within the lost circulation zone effect setting of the particulate sealing material.

16. The method of claim 14, further comprising the step of flowing a liquid after flush down the pipe string to the lost circulation zone where particulate sealing materials have previously been deposited to effect setting of the particulate sealing materials.

17. The method of claim 14, wherein the gas and entrained solids are flowed down the annulus between the pipe string and the well bore to the lost circulation zone to be sealed.

* * * * *